US012710229B2

(12) United States Patent
Bhambhani et al.

(10) Patent No.: US 12,710,229 B2
(45) Date of Patent: Aug. 18, 2026

(54) APPARATUS AND METHOD OF MICROWAVE VACUUM DRYING STERILE PRODUCTS

(71) Applicant: Merck Sharp & Dohme LLC, Rahway, NJ (US)

(72) Inventors: Akhilesh Bhambhani, Foster City, CA (US); Jeffrey T. Blue, Telford, PA (US); Robert K. Evans, Bangor, ME (US); Terrence Fennell, Ambler, PA (US); Justin Stanbro, Sellersville, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 791 days.

(21) Appl. No.: 17/999,650

(22) PCT Filed: Jun. 1, 2021

(86) PCT No.: PCT/US2021/035085
§ 371 (c)(1),
(2) Date: Nov. 22, 2022

(87) PCT Pub. No.: WO2021/247462
PCT Pub. Date: Dec. 9, 2021

(65) Prior Publication Data

US 2023/0288140 A1 Sep. 14, 2023

Related U.S. Application Data

(60) Provisional application No. 63/035,495, filed on Jun. 5, 2020.

(51) Int. Cl.
*F26B 3/347* (2006.01)
*F26B 5/04* (2006.01)
(Continued)

(52) U.S. Cl.
CPC .............. *F26B 3/347* (2013.01); *F26B 5/042* (2013.01); *F26B 19/005* (2013.01); *F26B 25/003* (2013.01); *F26B 25/008* (2013.01)

(58) Field of Classification Search
CPC ........ F26B 3/347; F26B 5/042; F26B 19/005; F26B 25/003; F26B 5/048; F26B 5/06; F26B 25/08; F26B 25/008
See application file for complete search history.

(56) References Cited

U.S. PATENT DOCUMENTS 2,781,644 A 2/1957 Vsevolod et al.
4,882,851 A 11/1989 Wennerstrum et al.
(Continued)

FOREIGN PATENT DOCUMENTS

CA 2781644 A1 7/2011
CN 102989195 A 3/2013
(Continued)

*Primary Examiner* — Jessica Yuen
(74) *Attorney, Agent, or Firm* — Su Kyung Suh; Andrew W. Custer

(57) ABSTRACT

A microwave vacuum dryer includes a loading chamber and a first vacuum pump in communication with the loading chamber, a first door separating the loading chamber from an external environment, a drying chamber adjacent the loading chamber, a second vacuum pump in communication with the drying chamber, and a condenser in communication with the drying chamber, a second door separating the loading chamber and the drying chamber, an unloading chamber adjacent the drying chamber and a third vacuum pump in communication with the unloading chamber, a third door separating the drying chamber from the unloading chamber, a fourth door separating the unloading chamber from the external environment, and a microwave chamber having a plurality of magnetrons, the microwave chamber positioned on a different plane from the loading and unloading chambers and adjacent the drying chamber.

19 Claims, 9 Drawing Sheets

(51) Int. Cl.
*F26B 19/00* (2006.01)
*F26B 25/00* (2006.01)

(56) References Cited

U.S. PATENT DOCUMENTS

| | | | |
|---|---|---|---|
| 5,205,050 | A | 4/1993 | Masaaki et al. |
| 6,524,539 | B1 | 2/2003 | Katschnig et al. |
| 9,267,734 | B2 | 2/2016 | Durance et al. |
| 9,958,203 | B2 | 5/2018 | Fu et al. |
| 2002/0017033 | A1 | 2/2002 | Wefers |
| 2010/0218395 | A1 | 9/2010 | Durance et al. |
| 2011/0014331 | A1 | 1/2011 | Stull, Jr. et al. |
| 2012/0090193 | A1 | 4/2012 | Wefers |
| 2012/0291305 | A1 | 11/2012 | Fu |
| 2019/0383556 | A1 | 12/2019 | Bhambhani et al. |
| 2020/0158431 | A1 | 5/2020 | Trout |

FOREIGN PATENT DOCUMENTS

| | | | |
|---|---|---|---|
| EP | 0252155 | B1 | 10/1993 |
| EP | 1066837 | B1 | 2/2007 |
| JP | 2012172875 | A | 9/2012 |
| KR | 20150092155 | A | 8/2015 |
| WO | 2014085897 | A1 | 6/2014 |
| WO | 2018209419 | A1 | 11/2018 |

APPARATUS AND METHOD OF MICROWAVE VACUUM DRYING STERILE PRODUCTS

CROSS REFERENCE TO RELATED APPLICATIONS

This application is the 371 national phase application of International Application No. PCT/US2021/035085, filed Jun. 1, 2021, published as WO 2021/247462 A1 on Dec. 9, 2021; which claims priority to U.S. Provisional Application No. 63/035,495 filed Jun. 5, 2020, each of which is herein incorporated by reference in its entirety.

FIELD OF THE DISCLOSURE

The present disclosure relates to apparatuses and methods for microwave vacuum-drying of organic materials, including biologically-active materials such as vaccines, antibiotics, proteins, and microorganism cultures.

BACKGROUND OF THE DISCLOSURE

Microwave vacuum-drying is a drying method that can be employed to dehydrate pharmaceutical biologic materials such as vaccines and antibodies. Microwave vacuum-drying, also called microwave vacuum dehydration, is a rapid drying method that can yield products with improved quality compared to air-dried and freeze-dried products. Because the drying is done under reduced pressure, the boiling point of water and the oxygen content of the atmosphere are lowered, so that components sensitive to oxidation and thermal degradation can be retained to a higher degree than by air-drying. The drying process is also much faster than air-drying and freeze-drying.

However, microwave vacuum-drying of pharmaceutical biologic materials at a large scale, while also complying with current Good Manufacturing Practice (cGMP) regulations, is difficult. Microwave vacuum-drying machines are currently made to address food safety concerns and are not designed to be used in a more stringently controlled GMP environment for drying pharmaceutical products. Using a microwave vacuum drying in cGMP conditions must be able to minimize particle generation during the drying process, allow drying to occur in a controlled and reproducible manner, as well as allow cleaning and sterilization of the drying chamber according to cGMP regulations.

SUMMARY OF THE DISCLOSURE

In one aspect of the disclosure, a microwave vacuum dryer includes a loading chamber and a first vacuum pump in communication with the loading chamber, a first door separating the loading chamber from an external environment, a drying chamber adjacent the loading chamber, a second vacuum pump in communication with the drying chamber, and a condenser in communication with the drying chamber, a second door separating the loading chamber and the drying chamber, an unloading chamber adjacent the drying chamber and a third vacuum pump in communication with the unloading chamber, a third door separating the drying chamber from the unloading chamber, a fourth door separating the unloading chamber from the external environment, and a microwave chamber having a plurality of magnetrons, the microwave chamber positioned on a different plane from the loading and unloading chambers and adjacent the drying chamber.

In another embodiment of the disclosure is a microwave vacuum dryer in accordance with the foregoing, wherein the microwave chamber is positioned underneath the drying chamber.

In another embodiment of the disclosure is a microwave vacuum dryer in accordance with the foregoing, wherein the drying chamber has at least two walls and a floor that define two inner parallel edges, the two edges comprising removable tray guidance rails.

In another embodiment of the disclosure is a microwave vacuum dryer in accordance with the foregoing, wherein the loading chamber, the drying chamber and the unloading chamber are each aligned along a central axis.

In another embodiment of the disclosure is a microwave vacuum dryer in accordance with the foregoing, wherein the first door and the fourth door are manually operable.

In another embodiment of the disclosure is a microwave vacuum dryer in accordance with the foregoing, wherein the second door and the third door are automatically operable and allow for simultaneous movement of the second and third doors.

In another embodiment of the disclosure is a microwave vacuum dryer in accordance with the foregoing, wherein the plurality of magnetrons is arranged in an array along a length of the drying chamber between the second and third doors.

In another embodiment of the disclosure is a microwave vacuum dryer in accordance with the foregoing, wherein the array of magnetrons is arranged in banks.

In another embodiment of the disclosure is a microwave vacuum dryer in accordance with the foregoing, wherein the banks comprise six banks of magnetrons.

In another embodiment of the disclosure is a microwave vacuum dryer in accordance with the foregoing, wherein each of the six banks of magnetrons includes three individual magnetrons.

In another embodiment of the disclosure is a microwave vacuum dryer in accordance with the foregoing, wherein each of the plurality of magnetrons has a predetermined power setting based on a location along the length of the drying chamber.

In another embodiment of the disclosure is a microwave vacuum dryer in accordance with the foregoing, wherein the drying chamber comprises a plurality of ports for monitoring the drying of containers of frozen solution. In some embodiments, the plurality of ports comprise a thermal imaging or fiber optic probe.

In another embodiment of the disclosure is a microwave vacuum dryer in accordance with the foregoing, wherein at least one of the unloading, drying and loading chambers comprises an outer gasket to act as a microwave seal when one of the doors to the chamber is closed, and an inner gasket adjacent the outer gasket, the inner gasket to provide a sterile boundary when one of the doors to the chamber is closed.

In another embodiment of the disclosure is a microwave vacuum dryer in accordance with the foregoing, wherein each of the unloading, drying and loading chambers comprises an outer gasket to act as a microwave seal when one of the doors to the chamber is closed, and an inner gasket adjacent the outer gasket, the inner gasket to provide a sterile boundary when one of the doors to the chamber is closed.

In another embodiment of the disclosure is a microwave vacuum dryer in accordance with the foregoing, further comprising a tray unloader housed within the unloading chamber, and a tray loader housed within the loading chamber.

In another embodiment of the disclosure is a microwave vacuum dryer in accordance with the foregoing, wherein the unloading chamber comprises a closeable valve for partially backfilling the unloading chamber with an inert gas, and a stoppering mechanism to close partially-stoppered containers.

In another aspect of the disclosure a method of drying a product, including but not limited to a pharmaceutical product that reflects GMP requirements, comprises providing a microwave vacuum dryer having a loading chamber and a first vacuum pump in communication with the loading chamber, a first door separating the loading chamber from an external environment, a drying chamber adjacent the loading chamber, a second vacuum pump in communication with the drying chamber, and a condenser in vapor communication with the drying chamber, a second door separating the loading chamber and the drying chamber, an unloading chamber adjacent the drying chamber and a third vacuum pump in communication with the unloading chamber, a third door separating the drying chamber from the unloading chamber, a fourth door separating the unloading chamber from the external environment, a microwave chamber having a plurality of magnetrons, the microwave chamber positioned on a different plane from the loading and unloading chambers and adjacent the drying chamber, evacuating air from the drying chamber using the second vacuum pump, and activating at least one of the plurality of magnetrons to generate a microwave field within the drying chamber.

In another embodiment of the disclosure is a method of drying a product in accordance with the foregoing, further comprising the step of recirculating water adjacent to the drying chamber to remove excess microwaves from the drying chamber.

In another embodiment of the disclosure is a method of drying a product in accordance with the foregoing, further comprising the steps of opening the first door, loading a first tray holding one or more containers having frozen solution into the loading chamber, closing the first door, and evacuating air from the loading chamber to equilibrate the environment of the loading chamber with the environment of the drying chamber.

In another embodiment of the disclosure is a method of drying a product in accordance with the foregoing, further comprising the steps of opening the second door, advancing the first tray of containers into the drying chamber using a tray loader housed within the loading chamber, and closing the second door.

In another embodiment of the disclosure is a method of drying a product in accordance with the foregoing, further comprising the steps of loading an additional tray into the loading chamber, closing the first door, and evacuating air from the loading chamber to equilibrate the environment of the loading chamber with the environment of the drying chamber.

In another embodiment of the disclosure is a method of drying a product in accordance with the foregoing, wherein the additional tray holds one or more containers having frozen solution, or wherein the additional tray is empty.

In another embodiment of the disclosure is a method of drying a product in accordance with the foregoing, further comprising the steps of pushing the additional tray into the drying chamber using a tray loader housed within the loading chamber, thereby pushing the first tray further into the drying chamber with the additional tray.

In another embodiment of the disclosure is a method of drying a product in accordance with the foregoing, further comprising repeating the step of loading additional trays into the loading chamber and pushing the tray ahead of it through the drying chamber, until the drying chamber is filled with trays.

In another embodiment of the disclosure is a method of drying a product in accordance with the foregoing, wherein the plurality of magnetrons is arranged in an array along a length of the drying chamber between the second and third doors, and wherein the magnetrons in different parts of the array are activated at different power levels before the first tray of containers is pushed into the drying chamber.

In another embodiment of the disclosure is a method of drying a product in accordance with the foregoing, wherein the plurality of magnetrons is arranged in an array along a length of the drying chamber between the second and third doors, and wherein the plurality of magnetrons are activated to one or more predetermined power levels, and wherein the plurality of magnetrons is activated after the drying chamber is filled with trays.

In another embodiment of the disclosure is a method of drying a product in accordance with the foregoing, further comprising the step of opening the third door, and advancing the first tray into the unloading chamber using a tray unloader housed within the unloading chamber.

In another embodiment of the disclosure is a method of drying a product in accordance with the foregoing, further comprising the step of advancing all of the trays from the drying chamber to the unloading chamber in a sequential manner.

In another embodiment of the disclosure is a method of drying a product in accordance with the foregoing, further comprising the step of removing the first tray from the unloading chamber.

In another embodiment of the disclosure is a method of drying a product in accordance with the foregoing, wherein the drying chamber has at least two walls and a floor that define two inner parallel edges, the two edges comprising removable tray guidance rails.

In another embodiment of the disclosure is a method of drying a product in accordance with the foregoing, further comprising the steps of operating the microwave vacuum dryer in a semi-continuous mode by performing the following steps sequentially: (i) evacuating air from the drying chamber with the second vacuum pump, (ii) recirculating water in a water chamber above the drying chamber, (iii) generating the microwave field within the drying chamber, (iv) loading a first tray of containers having frozen solution into the loading chamber and closing the first door, (v) evacuating air from the loading chamber to equilibrate the environment of the loading chamber with the environment of the drying chamber, and (vi) drying the frozen solution in the containers of the first tray within the drying chamber.

In another embodiment of the disclosure is a method of drying a product in accordance with the foregoing, further comprising the steps of operating the microwave vacuum dryer in a batch mode by performing the following steps sequentially: (i) evacuating air from the drying chamber with the second vacuum pump, (ii) loading a plurality of trays of containers containing frozen solution into the drying chamber via the loading chamber, (iii) recirculating water in a water chamber above the drying chamber, (iv) generating the microwave field within the drying chamber, and (v) drying the frozen solution in the containers within the drying chamber.

In another embodiment of the disclosure is a method of drying a product in accordance with the foregoing, wherein the unloading chamber comprises a closeable valve for partially backfilling the unloading chamber with an inert gas, and a stoppering mechanism to close partially-stoppered containers.

BRIEF DESCRIPTION OF THE DISCLOSURE

Various embodiments of the presently disclosed devices and methods are disclosed herein with reference to the drawings, wherein.

Figure 1:
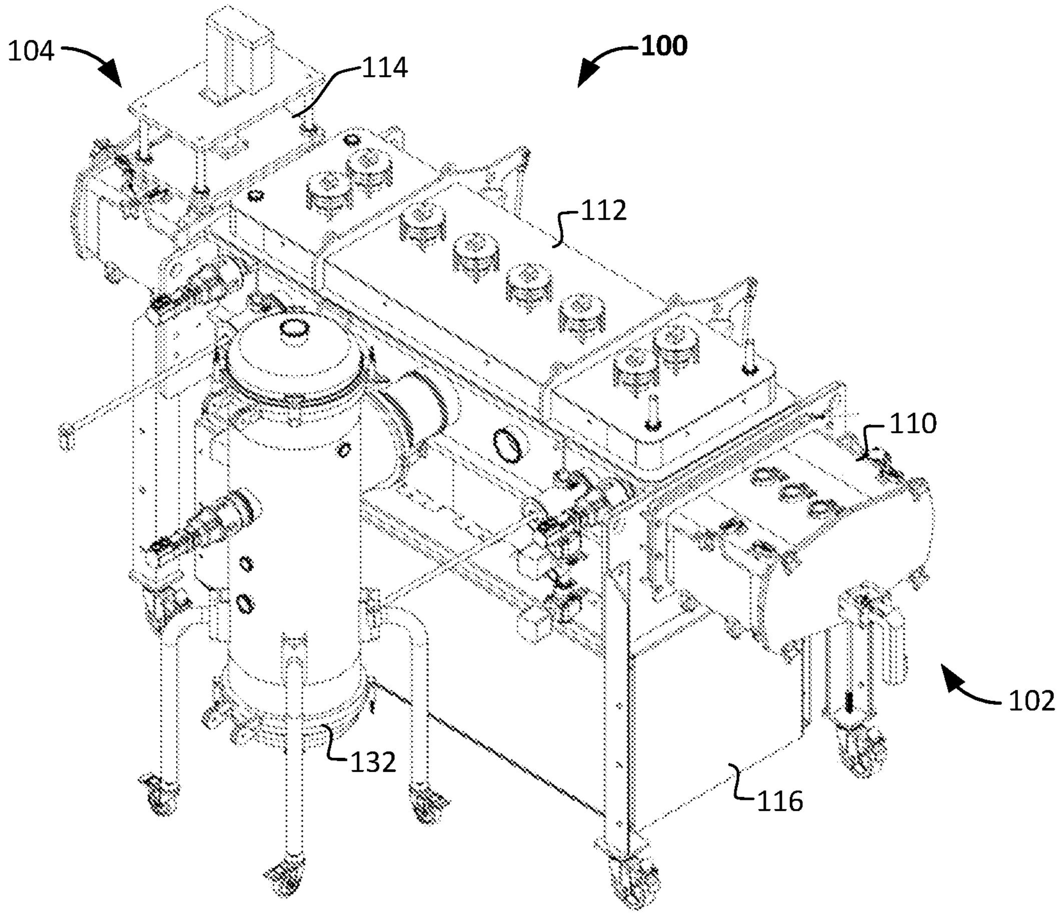
FIGS. 1-5 are schematic perspective, back, front, top and exploded perspective views of a microwave vacuum dryer.

Various embodiments will now be described with reference to the appended drawings. It is to be appreciated that these drawings depict only some embodiments of the disclosure and are therefore not to be considered limiting of its scope.

DETAILED DESCRIPTION

Despite the various improvements that have been made to microwave vacuum drying, conventional devices and methods suffer from some shortcomings.

Therefore, there is a need for further improvements to the devices and methods used for microwave vacuum drying, and especially for devices and methods that allow for more efficient manufacturing and permit, for example, continuous or semi-continuous manufacturing of live virus vaccines. Among other advantages, the present disclosure may address one or more of these needs.

FIGS. 1-5 illustrate one example of a microwave vacuum dryer 100 according to one embodiment of the present disclosure. Vacuum dryer 100 generally extends between a first end (or entrance) 102 and a second end (or exit) 104, and includes a plurality of chambers arranged adjacent one another. Beginning at the first end 102 and proceeding toward the second end 104, vacuum dryer 100 includes a loading chamber 110, a drying chamber 112, and an unloading chamber 114. The vacuum dryer 100 also includes a microwave chamber 116. In this example, the loading, drying and unloading chambers are aligned along a central axis with the drying chamber 112 being disposed between the other two chambers, and the microwave chamber 116 is disposed below the drying chamber.

Figure 12:
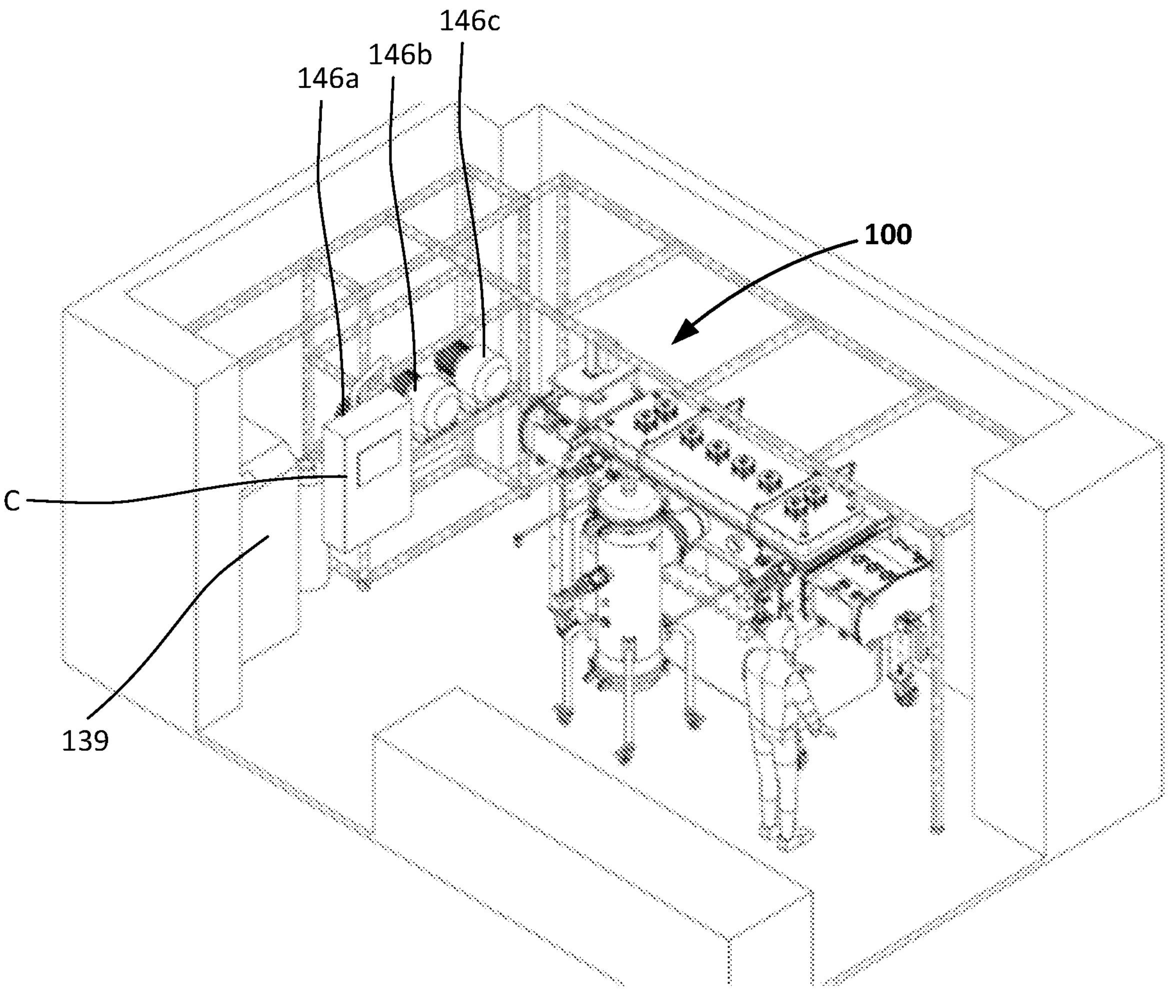
FIG. 12 is a schematic perspective view of a room having a microwave vacuum dryer.

A number of vacuum pumps 146, best seen in FIG. 12, may be in communication with the loading chamber 110, the drying chamber 112 and the unloading chamber 114. In at least some examples, each of these three chambers may have a designated vacuum pump 146*a-c* in communication therewith via a hose or tubing (e.g., vacuum pump 146*a* is in communication with loading chamber 110, vacuum pump 146*b* is in communication with drying chamber 112 via a condenser, and vacuum pump 146*c* is in communication with unloading chamber 114).

Figure 2:
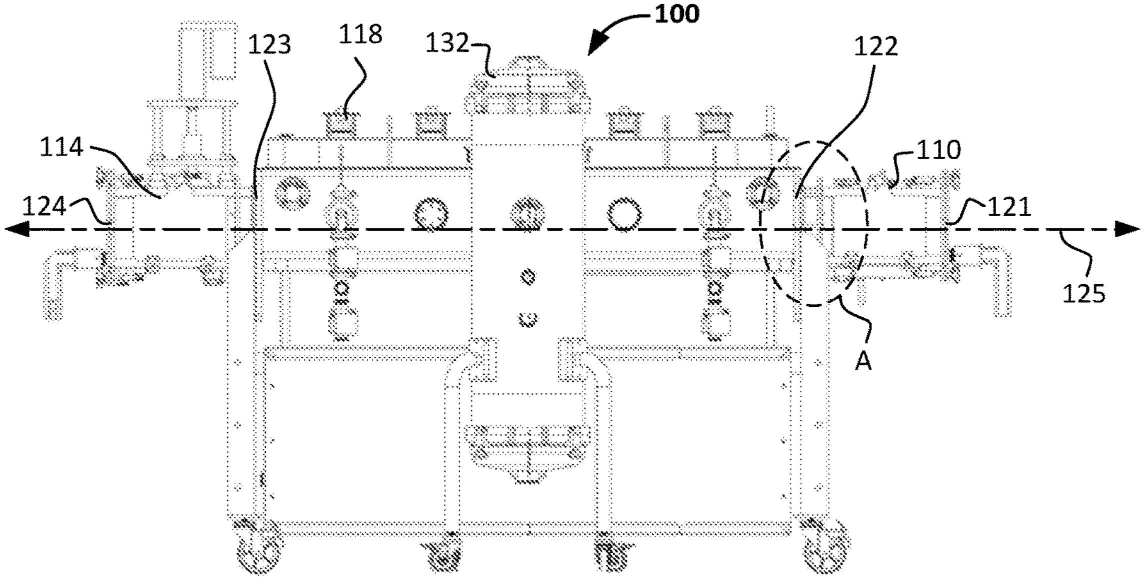

As best shown in FIG. 2, the loading chamber 110 and unloading chamber 114 each have a pair of airlock doors, respectively 121, 122 and 123, 124. These permit containers having a product to be loaded into, and unloaded from, these chambers while maintaining the chambers at the reduced pressure required for the dehydration process. Specifically, a first door 121 separates the loading chamber 110 from the external environment while a second door 122 separates loading chamber 110 from drying chamber 112. Likewise, a third door 123 separates drying chamber 112 from unloading chamber 114, while a fourth door 124 separates unloading chamber 114 from the environment. Each of these doors may be manually or automatically actuated to allow communication or a passage between a chamber and adjacent chamber or between the chamber and the environment. In at least some examples, the second and third doors are synchronized so that they open and/or close together at the same time. When the doors 121-124 are opened, a singular continuous passage 125 is formed from first end 102 to second end 104 as shown by a dashed line. Certain elements of the passage 125 adjacent the location of the doors is shown in detailed section "A", which corresponds to the photograph of FIG. 8.

Figure 8:
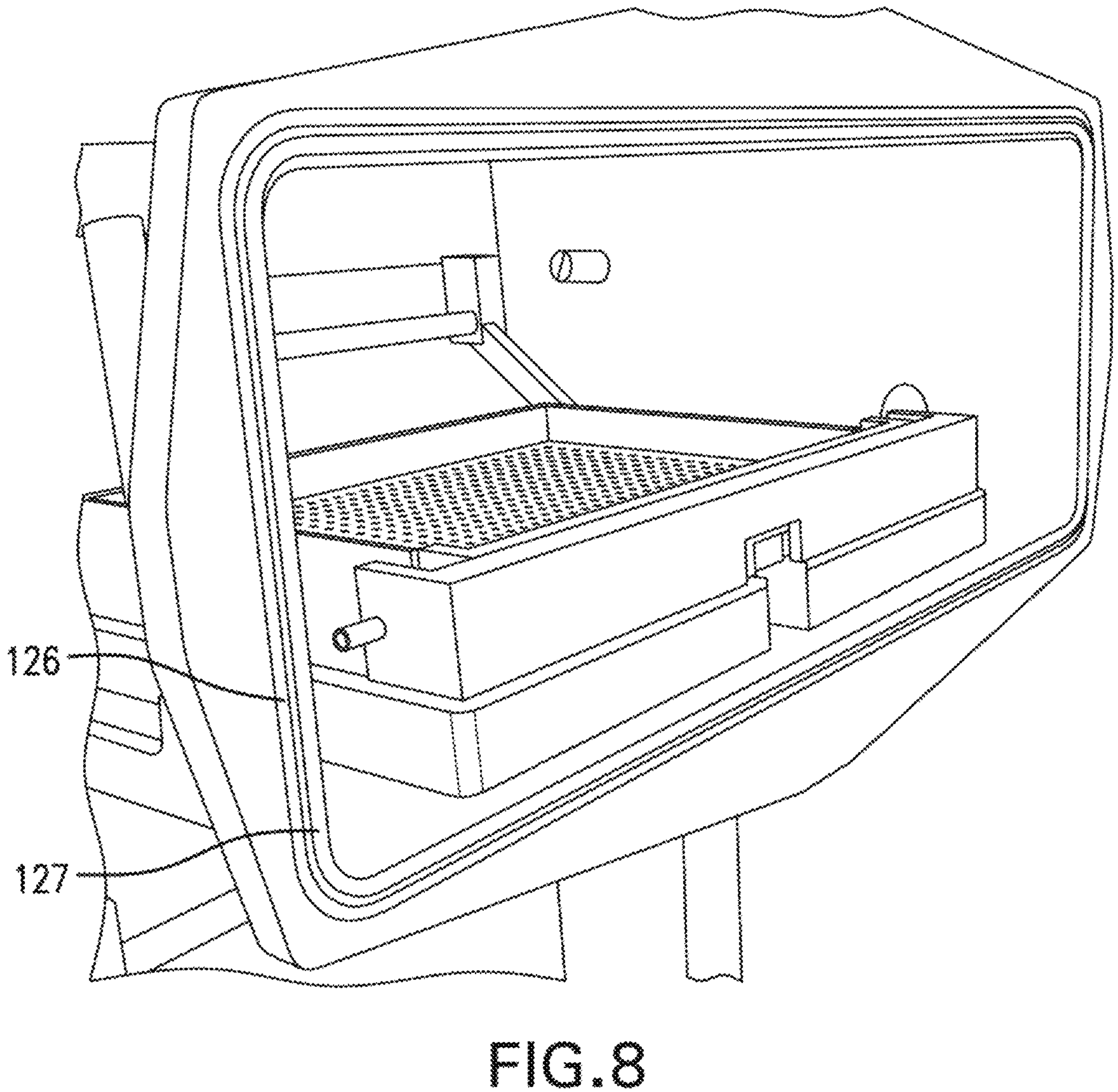
FIG. 8 is a photograph showing gaskets of a chamber.

Each of the chambers may generally include stainless steel, or other metals, or suitable materials that are capable of blocking the passage of microwaves. FIG. 8 is a photograph showing certain details of the chamber. Each of the unloading, drying and loading chambers may include sealing elements therebetween, such as an outer gasket 126 that serves as a microwave seal to prevent microwave leakage to protect the operator. An inner gasket 127 adjacent the outer gasket 126 may also be included, the inner gasket being a vacuum-rated gasket to provide a sterile boundary.

Turning back to FIG. 3, a microwave chamber 116 may be disposed below the drying chamber 112, and may include a plurality of magnetrons 130. The plurality of magnetrons 130 may be arranged in an array within the microwave chamber 116, beneath and along the length of the drying chamber 112. This array of magnetrons may include one or more banks or groupings (e.g., two, three, four, five, six, seven, eight, nine, ten, eleven, twelve or more banks of magnetrons), and each bank may include individual magnetrons 130 (e.g., one, two or three or more magnetrons per bank). In at least some examples, the magnetrons 130 may be arranged in a matrix of rows and columns of magnetrons, disposed below the drying chamber. Each of the plurality of magnetrons may be set to a predetermined power setting (e.g., between 50 to 900 Watts, between 50 to 500 Watts or between 100 to 500 Watts) based on a location along the length of the drying chamber. Alternatively, each of the magnetrons within a specific bank may be set to a predetermined power. Additionally, each of the magnetrons may be programmed to cycle on or off at a specific time during the process to improve uniformity in drying the products.

As noted, in certain examples, microwave chamber 116 is disposed below drying chamber 112 and microwaves are generated from the microwave chamber 116 below the drying chamber. The microwave may pass a travelling waveguide to get to the drying chamber. In these examples, the microwaves then pass through drying chamber 112 to a water circulation system 117 located above the drying chamber. Water circulation system 117 may include a microwave transparent tubing (e.g., plastic tube or pipe) in which cold water is recirculated. The tubing may be routed in a serpentine path parallel to the drying surface. This may prevent reflection of waves and standing waves, and allow for a single pass microwave. The floor and ceilings of the drying chamber may be formed of plastic or other microwave-transparent material to allow the passing of microwaves. At least one of the sides (e.g., sidewall, floor or ceiling) of the drying chamber may include a port for process monitoring. In at least some examples, this port is used for thermal imaging or fiber optic probes, which are desirable as they allow monitoring without breaking a sterile boundary. For example, ports 118 are located on the ceiling of drying chamber 112 (see FIG. 3). In some examples, the addition of a traveling wave guides, magnetron banks, water circulation system 117 and other features may provide uniformity of drying.

Figure 9:
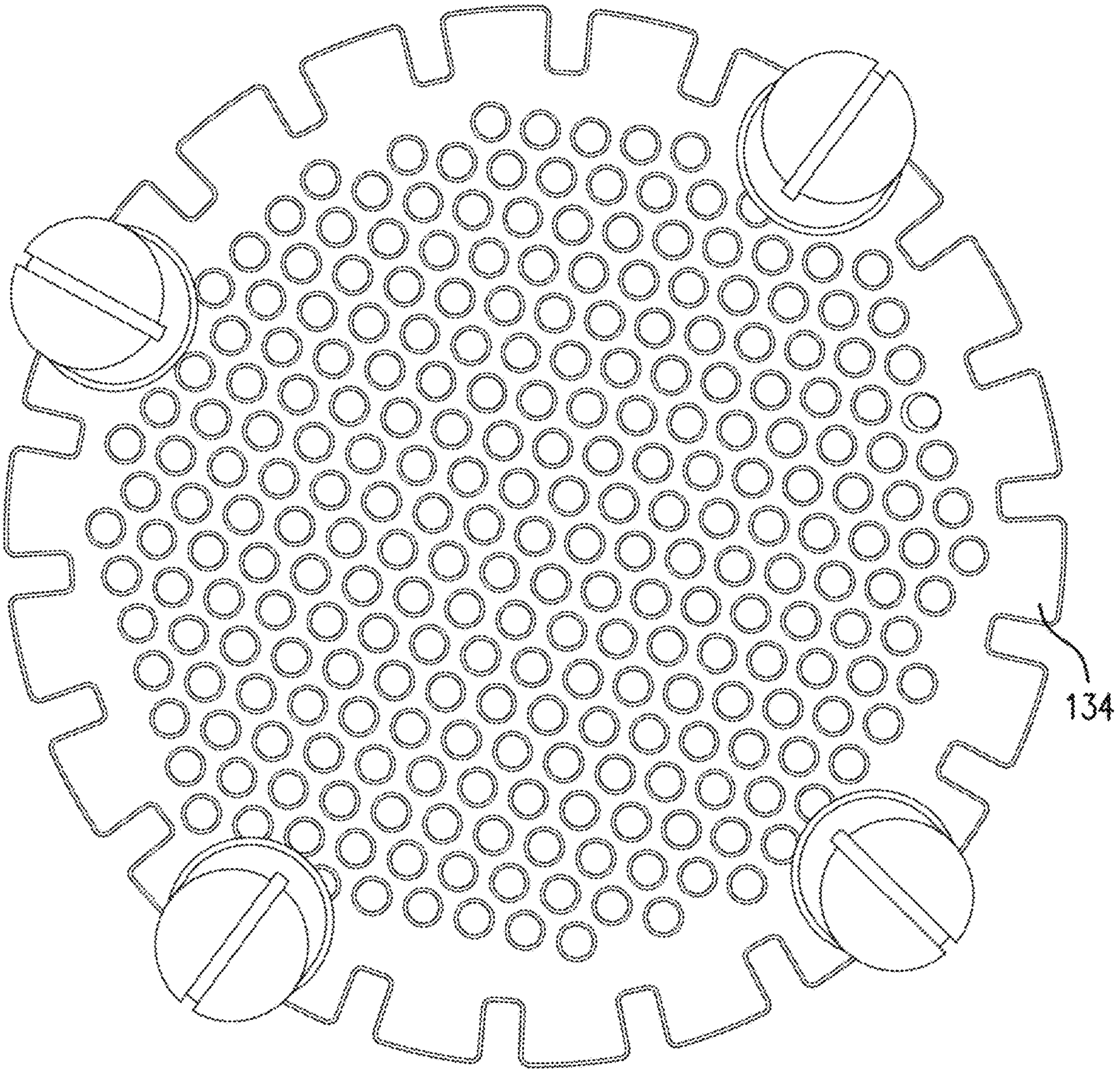
FIG. 9 is a photograph of a removable microwave barrier that can be detached for cleaning.

Microwave vacuum dryer 100 may further include a condenser 132 in communication with drying chamber 112 via a duct or tubing 133, the condenser being configured to receive sublimated vapor from the dehydrating product, and capturing it as ice on cold coils. Optionally, a removable microwave barrier 134 may be placed between the condenser and the drying chamber to prevent microwaves from getting into the condenser 132 (FIG. 9). The vacuum pumps 146 may evacuate the condenser, and a chiller 139 is configured to regulate the temperature of the condenser via a coolant and cool it to an appropriate temperature (FIG. 12). In at least some examples, the chiller 139 is configured to maintain the condenser at a temperature of between −60 and −80 degrees Celsius or colder. Additionally, two or more condensers may be used to allow for continuous operation so that a condenser may be emptied while another continues to run.

Figure 3:
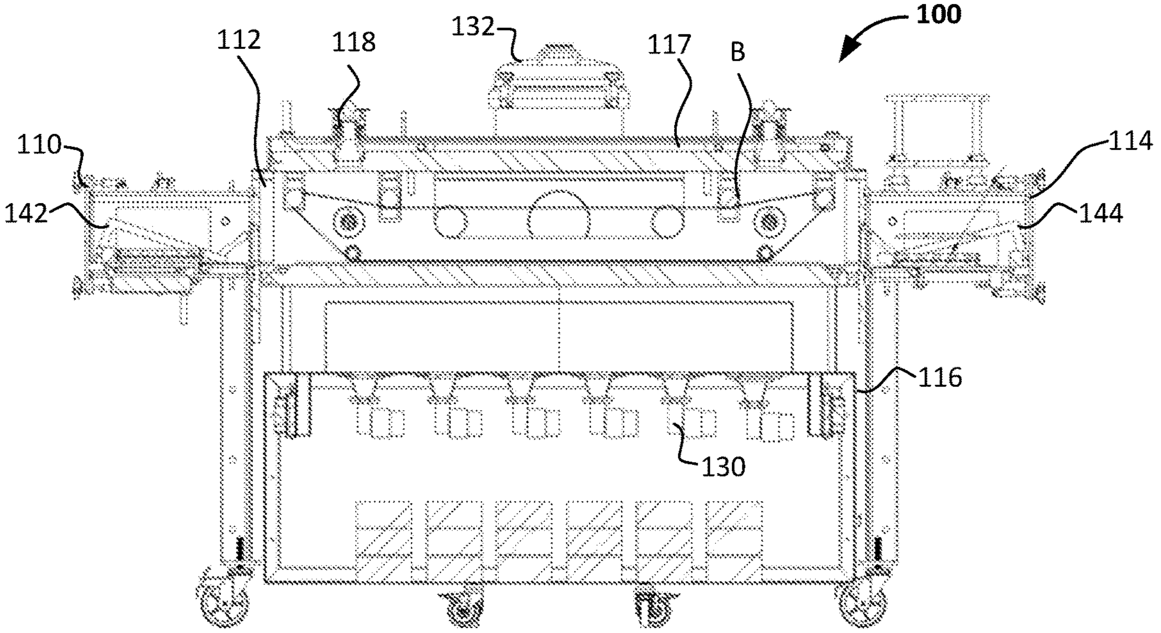
Figure 4:
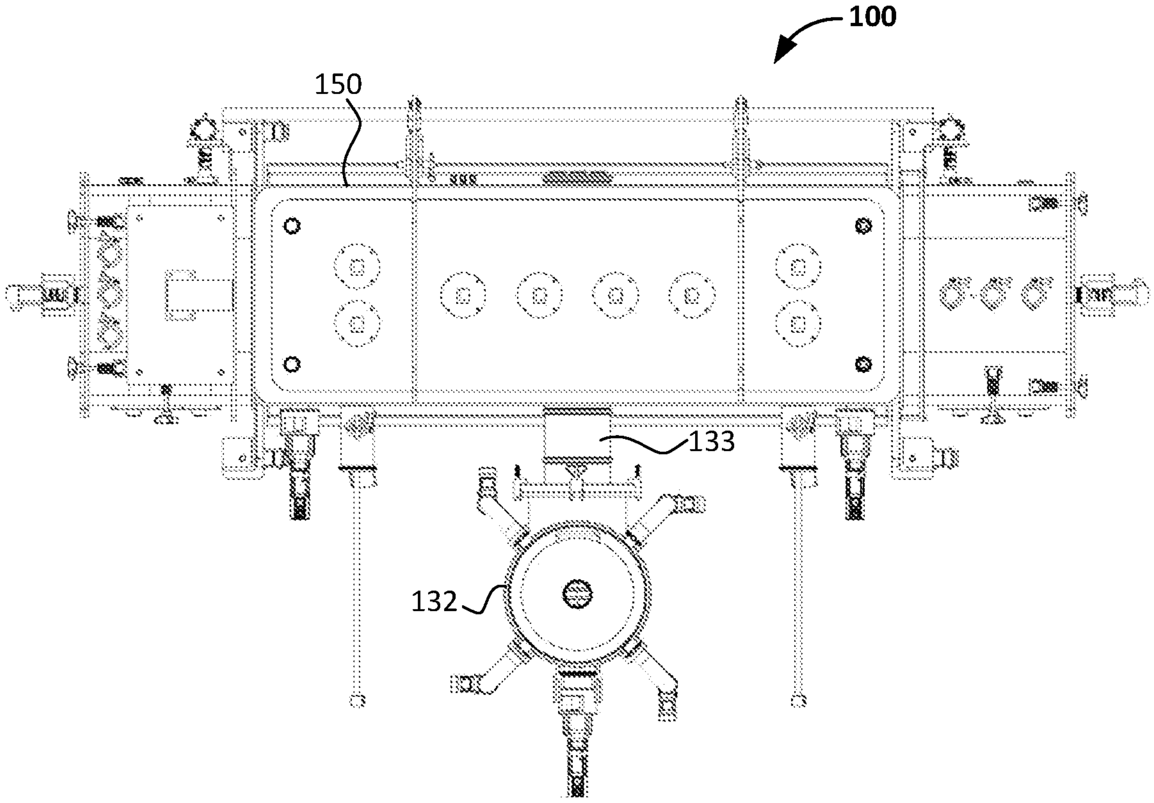
Figure 5:
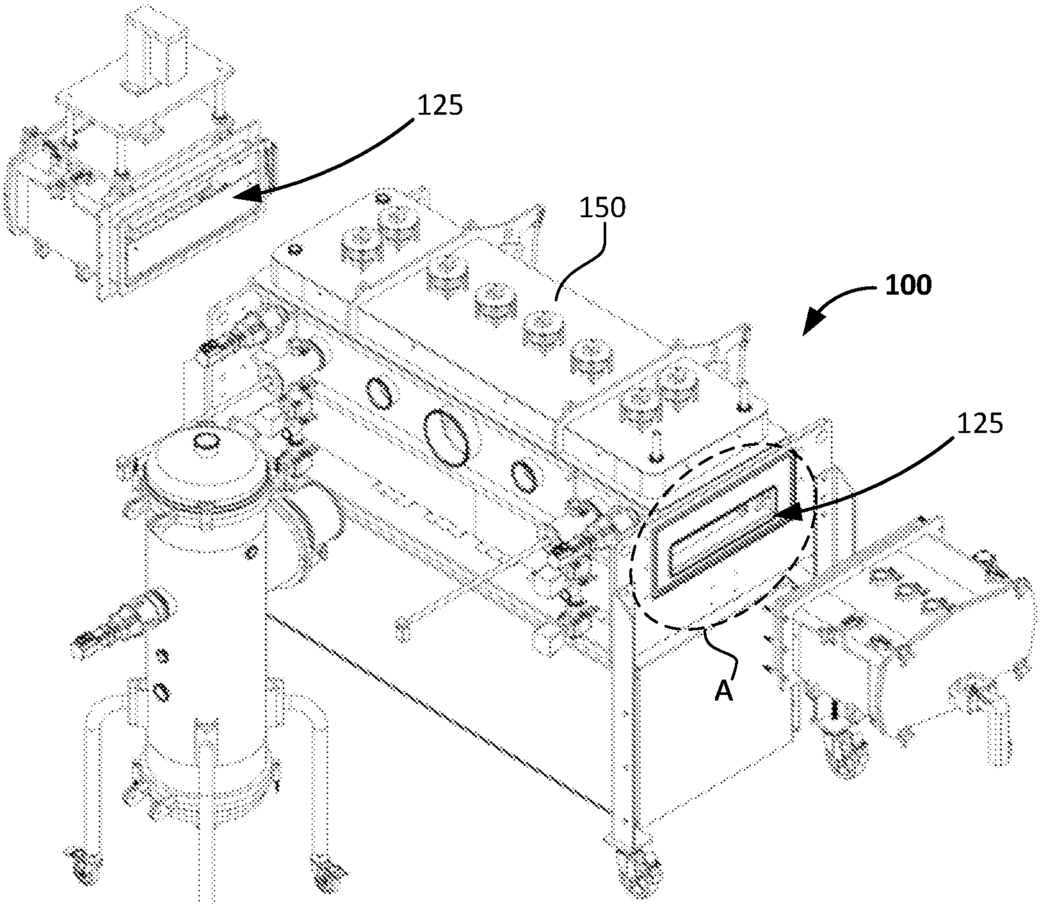
Figure 10:
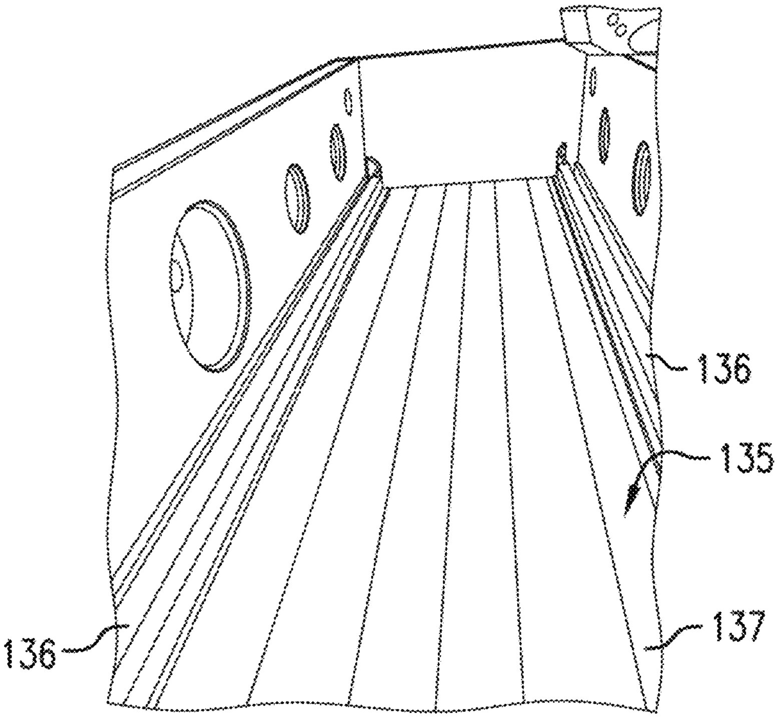
FIGS. 10-11 are photographs showing a channel inside a drying chamber.
Figure 11:
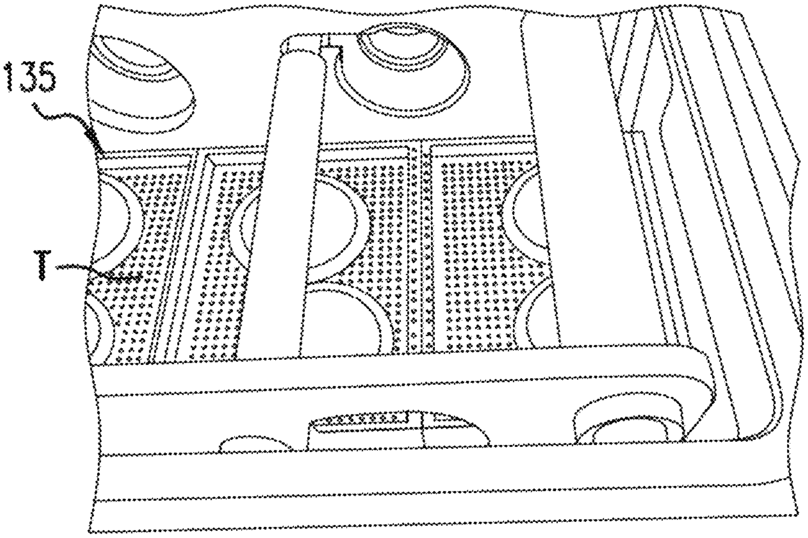

In FIG. 3, a belt system "B" runs through the drying chamber to provide a moving mechanism for moving the product from one side of the drying chamber 112 to the other. This configuration is not preferred for use in a current Good Manufacturing Practice (cGMP) environment, as particulates may be produced by the belt system. Alternatively, an oscillating ratcheting system of moveable walls may move trays through the drying chamber. In another embodiment, shown in FIGS. 10-11, a smooth guidance channel 135 having rails 136 may be used. Channel 135 may include two walls and a floor 137 that define two inner parallel edges, the two edges include removable tray guidance rails that can be removed for cleaning and reinserted into channel 135. In some examples, the rails 136 are disposed within troughs that are sloped to a low point drain. Channel 135 has no actuating components, but relies on a tray transport assembly to move trays "T" through the chambers.

In addition to a belt system, a ratcheting system or a smooth channel, a tray transport assembly may be used as best seen in FIG. 3. Tray transport assembly includes a tray loader, shown as a tray pusher 142, and a tray unloader, shown as a tray puller 144. In some examples, tray pusher 142 includes one or more arms disposed within loading chamber 110 in a first position, and configured and arranged to move to a second position within the drying chamber to drive a tray from loading chamber 110 into drying chamber 112 and retract back to its original position. In other examples, this process can be repeated two or more times to incrementally push the tray into the drying chamber. In some examples, tray puller 144 includes one or more arms disposed within unloading chamber 114 in a first position, and configured and arranged to move to a second position within the drying chamber to gather a tray from the drying chamber 112 into unloading chamber 114 and retract back to its original position. In other examples, this process can be repeated two or more times to incrementally pull the tray into the unloading chamber (e.g., the tray puller 144 may be actuated two or more times to pull a tray entirely into the unloading chamber).

Figure 6:
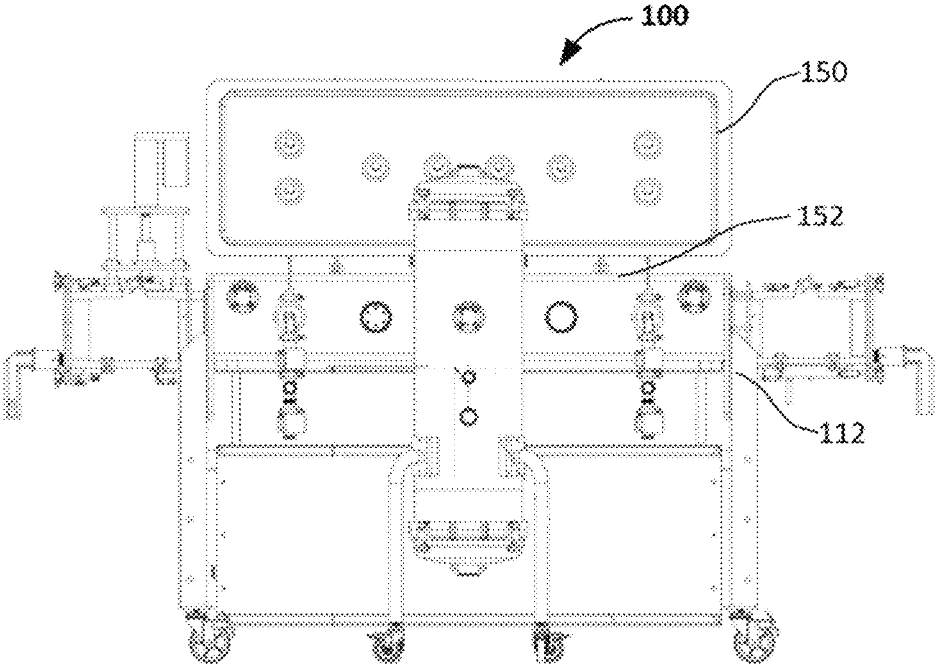
FIGS. 6-7 are schematic back and side views showing the microwave vacuum dryer of FIGS. 1-5 with a lid in an open condition.
Figure 7:
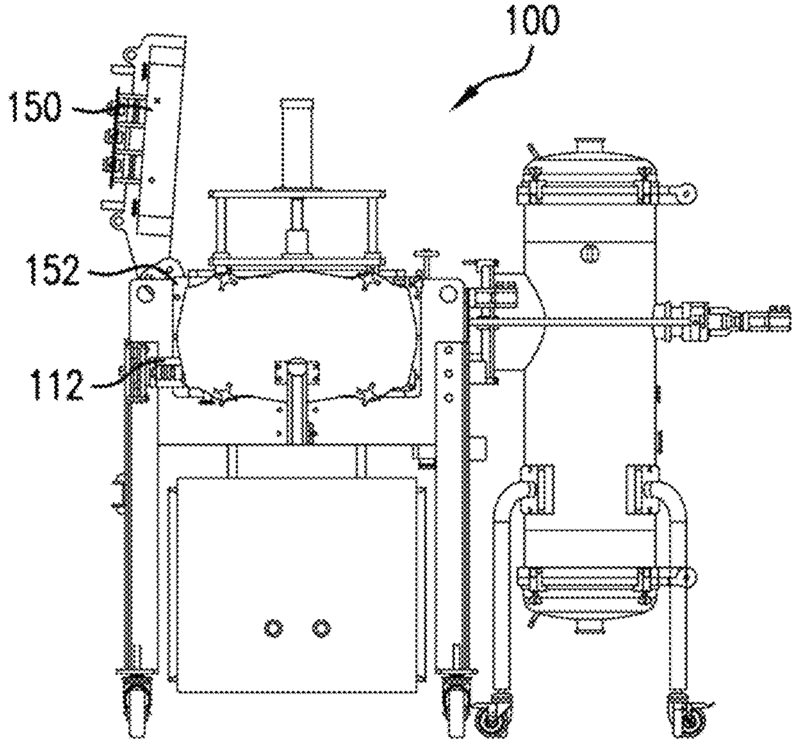

Optionally, drying chamber 112 may include a lid 150 configured to be opened or closed (FIGS. 6-7). In one example, lid 150 is coupled to the drying chamber via one or more hinges 152 so that the lid can be opened to allow for cleaning of the interior of the drying chamber. Lid 150 may house water circulation system 117.

Optionally, loading chamber 110, drying chamber 112, unloading chamber 114, and condenser 132 can be configured for sterilization by Vaporized Hydrogen Peroxide (VHP) using an external VHP generator system. Generally, VHP may use vaporized hydrogen peroxide as a broad spectrum anti-microbial and has efficacy against bacteria, yeast, viruses and bacterial spores thereby decontaminating the systems against the biological agent. The dryer may be configurable by the operator so that the optimal sterilization cycle can be achieved via circulation of VHP. VHP ports can be used either as inlets or outlets and may be located on the loading chamber 110, unloading chamber 114, and/or condenser 132. The system can be configured so that there is a single inlet and a single outlet, or multiple inlets and/or outlets (e.g., two inlets and one outlet, or two outlets and one inlet). The internal surfaces of the vacuum dryer 100 may be fabricated from materials that are not reactive with VHP, such as stainless steel, aluminum, acrylonitrile butadiene styrene (ABS), or polyvinyl chloride (PVC). In at least some examples, tray pusher 142, tray puller 144, second door 122, and/or third door 123 are cycled during VHP to ensure sterilization of their surfaces as well.

In use, vacuum dryer 100 may operate in one of two modes: a semi-continuous mode or a batch mode. Each of these modes will be now be described in greater detail. It will be understood that the same microwave vacuum dryer may be operated in either mode, and that the mode may be chosen by connecting the vacuum dryer to a computer, laptop, tablet or phone via either a wired or wireless connection, or through a built-in computer having a memory, a processor and an interface. In at least some examples, vacuum dryer 100 may have a controller "C" having a processor and a memory, the controller being capable of monitoring, adjusting or regulating the vacuum pumps 146, the magnetrons 130, the chiller 139, the condensers 132 and/or the water circulation system 117 (FIG. 12).

Semi-Continuous Mode

In semi-continuous mode, a vacuum pump evacuates condenser 132 and drying chamber 112 while doors 122,123 remain closed. Chiller 139 is enabled to cool the condenser 132 to a desired temperature. Optionally, chiller 139 is also used to cool a cooling table or plate disposed on the floor of loading chamber 110. The cooling plate may ensure that the frozen product does not exceed its glass transition temperature (Tg). The glass transition temperature is the temperature at which an amorphous material transitions from a rigid glass to a viscous solid. By keeping the product below its glass transition temperature during the loading process, the product is protected from damage and the bulk material is protected from collapsing. Vaccines and biologics formulations may have a glass transition temperature in a range of −28 to −41 degrees Celsius and thus it is desirable to keep them frozen below their respective glass transition temperature prior to starting the drying process.

Once a target vacuum in drying chamber 112 and a target temperature in condenser 132 is reached, magnetrons 130 in microwave chamber 116 are turned on to generate a microwave field. Water is recirculated through water circulation system 117 to remove excess microwaves from the drying chamber. Frozen product disposed in containers (e.g., vials, beads, dual chamber cartridges, bulk cake in a bottle or tray, etc.) may be placed on a tray and loaded manually into loading chamber 110. The frozen product itself may include any one or more of a live virus vaccine, enveloped and non-enveloped virus, adjuvants, subunit vaccine, protein, peptide, antibody-drug conjugate (ADC), bispecific, fusion protein and/or small molecule drug. Door 121 is then closed and a second vacuum pump evacuates the loading chamber 110. If enabled, the cooling table in the loading chamber 110 is used to keep the product frozen during evacuation.

Once loading chamber 110 has equilibrated with drying chamber 112, second door 122 is automatically (or manually) opened and a tray pushing mechanism pushes the tray of products into drying chamber 112. Optionally, position sensors may be incorporated into the drying chamber or loading chamber to monitor the position of the tray. The tray pusher 142 may then retract and optionally provide subsequent pushes to completely load the tray into the drying chamber. After the final push, the tray pusher 142 may then retract and second door 122 may close. The drying process in drying chamber 112 may then begin for the first tray. At any point, the operator can load a second tray into loading chamber 110. Specifically, vacuum is released in loading chamber 110 and the first door 121 is opened. Next, the operator may load a tray having frozen product as described above. First door 121 may then be closed, and loading chamber 110 may be evacuated and held within the loading chamber 110 for a calculated amount of time. In some examples, the calculated time is determined by the desired overall drying time divided by the number of positions in drying chamber 112. Once the calculated time has elapsed, this second tray is pushed into drying chamber 112 as described above. When the second tray moves into drying chamber 112, the second tray will contact and push the abutting first tray further down the line within drying chamber 112. In this manner, each tray being pushed by tray pusher 142 is used to advance trays within the drying chamber 112 without generating particulates.

This process may repeat at timed intervals until all drying positions in drying chamber 112 are filled. Throughout this process, trays of product are dehydrated and their water vapor collected at condenser 132. At any point in time, each tray is at a different point in its dehydration profile. Therefore, magnetrons 130 may be programmed, configured and arranged to be activated at different power settings based on their locations within the drying chamber 112 and/or the heat required for that portion of the dehydration cycle.

At the second end 104 of vacuum dryer 100, trays are unloaded in the same sequence that they were loaded. Once the first tray has spent the appropriate amount of time in the final drying location in drying chamber 112, the unloading process starts. Vacuum is pulled in unloading chamber 114 by a third pump. When unloading chamber 114 is equilibrated to drying chamber 112, third door 123 is automatically opened. A tray puller 144 reaches into drying chamber 112 and retrieves the tray into unloading chamber 114. Optionally, the tray puller 144 may perform multiple reach/retraction steps to incrementally unload the tray. After full retraction, the third door 123 may then be closed. For partially stoppered vials, an optional gaseous backfill can be performed to provide partial vacuum in the vials. The gas may be selected from selected from nitrogen, argon or a suitable gas, and the backfilling may be conducted at a pressure of between 200 Torr-750 Torr, between 450-700 Torr, or at or about 540 Torr. A stoppering plate compresses the vials to seat the vials. The stoppering plate may be driven by a hydraulic, pneumatic, or electrical motor in the external environment that couples to the stoppering plate via a bellowed shaft to maintain sterility of the unloading chamber 114. The stoppering plate may be configured to perform multiple compressions at programmable forces and dwell times. After this, the vacuum is released and the operator manually unloads the tray from fourth door 124.

When trays are removed from unloading chamber 114, fourth door 124 is closed and vacuum is pulled in unloading chamber 114 again. The unloading process repeats as described above until the final tray is removed. Because tray movement through drying chamber 112 is dependent upon new trays being introduced through loading chamber 110, "dummy trays" that contain no product, but are of similar weight as the product tray, must be loaded until the final product tray is unloaded. Alternatively, weights equal to loaded vials may be added to the "dummy trays".

Batch Mode

A similar method may be used in batch mode, with certain differences. After drying chamber 112 is evacuated, but before the magnetrons 130 are turned on, the product trays may be loaded into loading chamber 110. Trays are loaded using the same loading process as above, but there is no hold time between tray loading events. Once drying chamber 112 is loaded using tray pusher 142, the magnetrons 130 are turned on. Instead of having different power settings by location within the drying chamber 112, magnetron 130 power is varied by time. After a sufficient drying time (e.g., between 3 and 24 hours, the magnetrons 130 are turned off. Trays are then unloaded as described previously, one tray immediately after the other from the unloading chamber 114.

It is to be understood that the embodiments described herein are merely illustrative of the principles and applications of the present disclosure. Moreover, certain components are optional, and the disclosure contemplates various configurations and combinations of the elements disclosed herein. It is therefore to be understood that numerous modifications may be made to the illustrative embodiments and that other arrangements may be devised without departing from the spirit and scope of the present disclosure as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed:

1. A microwave vacuum dryer comprising:

a loading chamber and a first vacuum pump in communication with the loading chamber;

a first door separating the loading chamber from an external environment;

a drying chamber adjacent the loading chamber, a second vacuum pump in communication with the drying chamber, and a condenser in communication with the drying chamber;

a second door separating the loading chamber and the drying chamber;

an unloading chamber adjacent the drying chamber and a third vacuum pump in communication with the unloading chamber;

a third door separating the drying chamber from the unloading chamber;

a fourth door separating the unloading chamber from the external environment; and a microwave chamber having a plurality of magnetrons, the microwave chamber positioned on a different plane from the loading and unloading chambers and adjacent the drying chamber, wherein each of the unloading, drying and loading chambers comprises an outer gasket to act as a microwave seal when one of the doors to the chamber is closed, and an inner gasket adjacent the outer gasket, the inner gasket to provide a sterile boundary when one of the doors to the chamber is closed.

2. The microwave vacuum dryer of claim 1, wherein the drying chamber has at least two walls and a floor that define two inner parallel edges, the two edges comprising removable tray guidance rails.

3. The microwave vacuum dryer of claim 1, wherein the plurality of magnetrons is arranged in an array along a length of the drying chamber between the second and third doors.

4. The microwave vacuum dryer of claim 3, wherein each of the plurality of magnetrons has a predetermined power setting based on a location along the length of the drying chamber.

5. The microwave vacuum dryer of claim 1, further comprising a tray unloader housed within the unloading chamber, and a tray loader housed within the loading chamber.

6. The microwave vacuum dryer of claim 1, wherein the unloading chamber comprises a closeable valve for partially backfilling the unloading chamber with an inert gas, and a stoppering mechanism to close partially-stoppered containers.

7. A method of drying a product, comprising:

providing a microwave vacuum dryer having a loading chamber and a first vacuum pump in communication with the loading chamber, a first door separating the loading chamber from an external environment, a drying chamber adjacent the loading chamber, a second vacuum pump in communication with the drying chamber, and a condenser in vapor communication with the drying chamber, a second door separating the loading chamber and the drying chamber, an unloading chamber adjacent the drying chamber and a third vacuum pump in communication with the unloading chamber, a third door separating the drying chamber from the unloading chamber, a fourth door separating the unloading chamber from the external environment, a microwave chamber having a plurality of magnetrons, the microwave chamber positioned on a different plane from the loading and unloading chambers and adjacent the drying chamber;

evacuating air from the drying chamber using the second vacuum pump; and activating at least one of the plurality of magnetrons to generate a microwave field within the drying chamber, providing each of the unloading, drying and loading chambers with an outer gasket to seal a microwave when one of the doors to the chamber is closed and an inner gasket adjacent the outer gasket, the inner gasket provides a sterile boundary when one of the doors to the chamber is closed.

8. The method of claim 7, further comprising the step of recirculating water adjacent to the drying chamber to remove excess microwaves from the drying chamber.

9. The method of claim 7, further comprising the steps of opening the first door, loading a first tray holding one or more containers having frozen solution into the loading chamber, closing the first door, and evacuating air from the loading chamber to equilibrate the environment of the loading chamber with the environment of the drying chamber.

10. The method of claim 9, further comprising the steps of opening the second door, advancing the first tray of containers into the drying chamber using a tray loader housed within the loading chamber, and closing the second door.

11. The method of claim 10, further comprising the steps of loading an additional tray into the loading chamber, closing the first door, and evacuating air from the loading chamber to equilibrate the environment of the loading chamber with the environment of the drying chamber.

12. The method of claim 11, wherein the additional tray holds one or more containers having frozen solution, or wherein the additional tray is empty.

13. The method of claim 11, further comprising the steps of pushing the additional tray into the drying chamber using a tray loader housed within the loading chamber, thereby pushing the first tray further into the drying chamber with the additional tray.

14. The method of claim 13, further comprising repeating the step of loading additional trays into the loading chamber and pushing the tray ahead of it through the drying chamber, until the drying chamber is filled with trays.

15. The method of claim 14, wherein the plurality of magnetrons is arranged in an array along a length of the drying chamber between the second and third doors, and wherein the magnetrons in different parts of the array are activated at different power levels before the first tray of containers is pushed into the drying chamber.

16. The method of claim 14, wherein the plurality of magnetrons is arranged in an array along a length of the drying chamber between the second and third doors, and wherein the plurality of magnetrons are activated to one or more predetermined power levels, and wherein the plurality of magnetrons is activated after the drying chamber is filled with trays.

17. The method of claim 7, further comprising providing the drying chamber with at least two walls and a floor that define two inner parallel edges, providing the two edges with removable tray guidance rails.

18. The method of claim 7, further comprising the steps of operating the microwave vacuum dryer in a semi-continuous mode by performing the following steps sequentially: (i) evacuating air from the drying chamber with the second vacuum pump, (ii) recirculating water in a water chamber above the drying chamber, (iii) generating the microwave field within the drying chamber, (iv) loading a first tray of containers having frozen solution into the loading chamber and closing the first door, (v) evacuating air from the loading chamber to equilibrate the environment of the loading chamber with the environment of the drying chamber, and (vi) drying the frozen solution in the containers of the first tray within the drying chamber.

19. The method of claim 7, further comprising the steps of operating the microwave vacuum dryer in a batch mode by performing the following steps sequentially: (i) evacuating air from the drying chamber with the second vacuum pump, (ii) loading a plurality of trays of containers containing frozen solution into the drying chamber via the loading chamber, (iii) recirculating water in a water chamber above the drying chamber, (iv) generating the microwave field within the drying chamber, and (v) drying the frozen solution in the containers within the drying chamber.

* * * * *